Feb. 20, 1968 J. L. HEINLEIN 3,369,628
DRAWBAR PIN FOR FREE END YOKE OF A POWER TAKE-OFF ASSEMBLY
Filed Dec. 30, 1966

INVENTOR
JOHN L. HEINLEIN
BY Greist, Lockwood,
Grunawalt & Dewey  ATT'YS.

United States Patent Office 3,369,628
Patented Feb. 20, 1968

3,369,628
DRAWBAR PIN FOR FREE END YOKE OF A
POWER TAKE-OFF ASSEMBLY
John L. Heinlein, Shelbyville, Ill., assignor to Oliver Corporation, Chicago, Ill., a corporation of Delaware
Filed Dec. 30, 1966, Ser. No. 606,270
1 Claim. (Cl. 180—14)

ABSTRACT OF THE DISCLOSURE

A drawbar pin for joining overlapping drawbars of a prime mover and an implement for articulated movement. Means is provided to elevate the enlarged head of the pin above the uppermost drawbar and hold it in the elevated position to receive a free end of a connecting yoke of a power take-off drive shaft after disconnection from either the prime mover or the implement, thus providing non-operational transportation and storage to prevent damage to the power take-off shaft assembly.

---

This invention relates to a new and improved drawbar pin for the free end yoke of a power take-off assembly and a novel method of storing the power take-off drive shaft assembly during non-operational transportation or seasonal storage of the implement or prime mover.

In agricultural harvesting operations, an agricultural implement such as a baler equipped with a bale thrower, a self-unloading wagon or the like is drawn behind a prime mover through interfitted drawbars which are joined for articulated movement by means of a drawbar pin. Power from the power take-off shaft on the prime mover or tractor is transmitted through an extensible power take-off shaft assembly joined to the power take-off shaft on the prime mover and a forwardly projecting shaft on the trailing implement.

The power take-off shaft assembly generally includes a pair of telescoping tubular members which permit the overall length to be varied with each of the tubes equipped at opposite ends with universal joints having free end yokes for connection to the driving and driven power take-off shafts in a well-known manner. A latch pin is provided on each of the yokes to assure a complete connection. As is evident, the universal action is located at points which are spaced from the axis of movement formed by the drawbar pin. Accordingly, when the implement is transported to a new field location, in some cases the drawbar is shifted to provide reduced clearance for road transportation. The usual turning movements oftentimes result in damage to the power take-off drive shaft assembly if it is not disconnected at one end or the other. The problem has been recognized by those faced with it, and attempts at solution made by releasing one end of the power take-off drive shaft assembly during non-operational transportation. The free or disconnected end is retained to the drawbar with either the prime mover or the implement through wire, twine or other crude fastening means. The undesirability of such method of solving this problem is self-evident.

A more refined solution is demonstrated in the prior art. A special bracket or the like is provided on the implement to receive the end of the power take-off shaft which is disconnected from the prime mover. The objection to this arrangement is the added expense of forming and attaching such a bracket, the limitation on which end of the shaft may be disconnected, the unattractive appearance, and the hazards the bracket presents to the operator who is attaching and detaching the implement from the prime mover. The latter objection was sought to be overcome by a later provision of a pivoting bracket which is hinged for movement to an out-of-the-way storage position, but this was more costly than the predecessor fixed bracket design. Where the drawbar on the implement is shiftable laterally for road transportation, the problem of proper bracket location and angularity arises. Most generally, it is limited to a location close to the forward end of the drawbar. If the power take-off shaft is to be stored on the prime mover under the suggested prior art methods, a second bracket must be provided on the prime mover drawbar as well as the drawbar of the trailing implement, thus further increasing the cost.

The present invention relates to an inexpensive retainer means to provide temporary storage of either end of a power take-off drive shaft assembly. The retainer means consists of a new and improved drawbar or connecting pin which serves two basic functions. The first is to join the drawbar of the prime mover to the drawbar of the implement for articulated movement and the second is to provide a storage means for the free (disconnected) end of the power take-off drive shaft assembly. Since the drawbar pin may be carried on either the implement drawbar or prime mover drawbar, either end of the power take-off drive shaft assembly may be disconnected and stored.

The drawbar or connecting pin is provided with an enlarged head and an elongated shank adapted for extending through aligned apertures in the drawbars. Suitable means, such as a retainer clip, may be provided to preclude inadvertent removal of the pin from the drawbars. Additional retainer clip means is provided centrally of the shank to permit the enlarged head of the connecting pin to be elevated above the drawbars while the lower portion of the shank holds the drawbars joined for articulated movement. The enlarged head of the connecting pin is dimensioned to receive the connecting yoke on the free or disconnected end of a power take-off drive shaft assembly. If the yoke is provided with a latch, the latch will serve to lock the yoke to the pin.

The method of storing the drawbar consists of elevating the connecting pin to position the enlarged head above the drawbars. Thereafter, the latch on the connecting yoke is released and the yoke removed from the associated shaft. The power take-off drive shaft assembly may then be collapsed to bring the connecting yoke at the free end into alignment with the enlarged head of the connecting pin. With the latch in the unlocked position, the connecting yoke is slipped over the enlarged head of the connecting pin and the latch released thereby to lock the free end yoke to the connecting pin. Additional advantages of the invention other than those described briefly above will become apparent upon a consideration of the objects achieved and a description of a preferred embodiment.

It is an object of this invention to provide a novel connecting pin for joining the interfitted drawbars of a prime mover and a trailing implement, which connecting pin includes an enlarged head and shank and means to permit the head to be elevated above the drawbars and maintained in such position whereby it may receive a yoke of a disconnected or free end power take-off drive shaft assembly during non-operational transportation, seasonal storage of the implement or the like.

It is a further object of this invention to provide an inexpensive retainer means to provide temporary storage of the free end of a power take-off drive shaft assembly during non-operational transportation of the equipment to which it is joined.

It is a still further object of this invention to provide a new and improved method of storing power take-off drive shaft assemblies.

Other objects will become apparent on consideration of the following description and accompanying drawings wherein.

Figure 1:
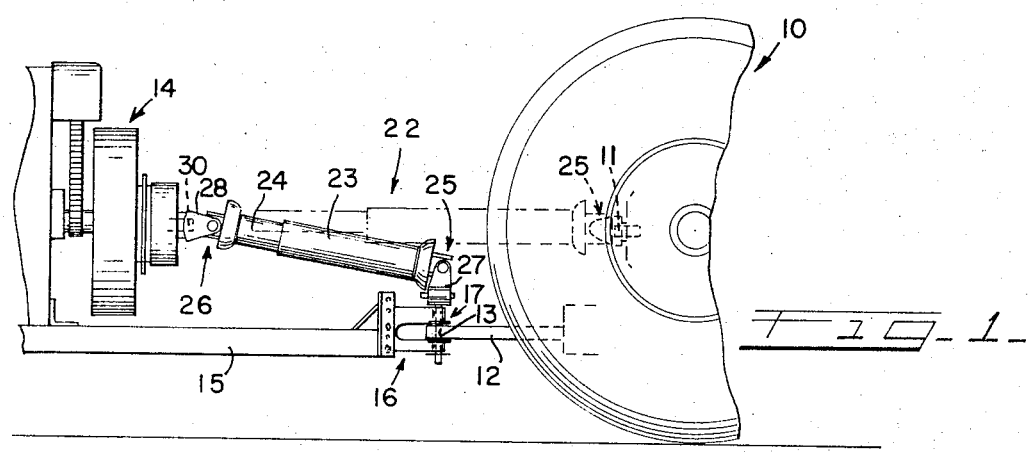
FIGURE 1 is a fragmentary side elevational view of a prime mover and a trailing implement with an extensible power take-off drive shaft assembly shown in dotted lines connected to the drive and driven shafts on the prime mover and the implement, respectively, and illustrated in solid lines in one of the storage positions.

Referring now to FIGURE 1, a prime mover is indicated generally at 10 and may consist of a tractor or other self-powered vehicle adapted to draw a trailing implement 14 and to provide rotary power to the trailing implement 14 from a driven power take-off stub shaft indicated in dotted lines at 11. The prime mover includes a rearwardly projecting drawbar 12 which is provided with a suitable aperture 13.

Figures 2, 4:
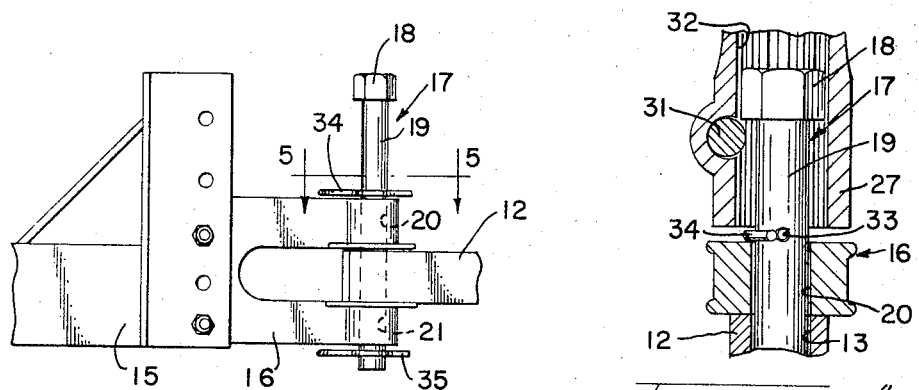
FIGURE 2 is a fragmentary enlarged side elevational view of the drawbars and connecting pin with the pin in the elevated position.
FIGURE 4 is an enlarged cross-sectional view taken generally along the line 4—4 of FIGURE 3 to illustrate co-operation of the yoke latch with the head of the connecting pin.

The implement indicated at 14 is provided with a forwardly projecting drawbar or tongue 15 terminating in a bifurcated section 16 having apertures 20 and 21 therein and adapted to receive the drawbar 12 of the prime mover. As shown in FIGURES 1 and 2, the drawbars 15 and 12 are joined together for articulated movement by means of a connecting pin indicated generally at 17. The pin 17 is of conventional design, having an enlarged head portion 18 formed at the upper end of an elongated shank portion 19 which extends through aligned apertures 13, 20 and 21 to join the prime mover and trailing implement.

Referring once again to FIGURE 1, a conventional power take-off drive shaft assembly is indicated generally at 22 and includes telescoping tubular portions 23 and 24 having universal joints 25 and 26 attached at opposite ends. The universal joints 25 and 26 are of conventional design, each having an end joke 27 and 28 which provides for attachment to the drive shaft 11 on the prime mover 10 and the driven shaft 30 on the implement 14, respectively, when the power take-off drive shaft assembly 22 is in the position shown in phantom lines in FIGURE 1.

Figures 3, 5:
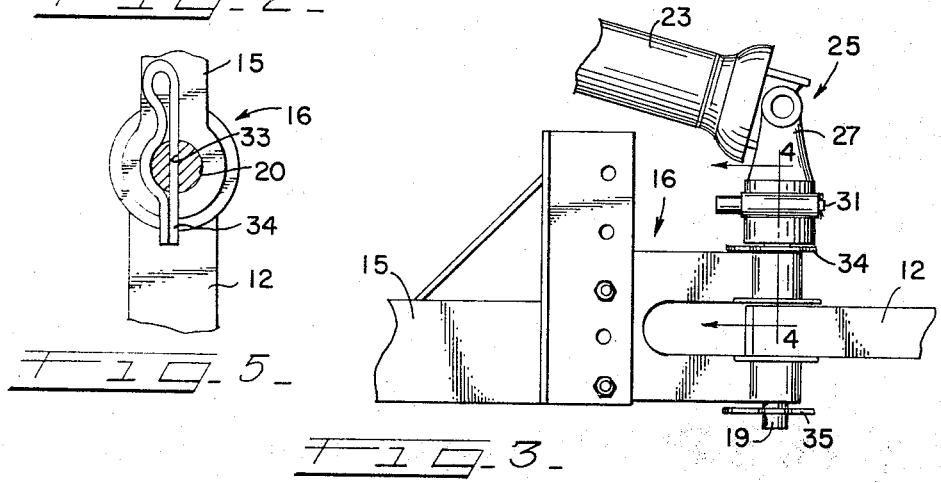
FIGURE 3 is a view similar to FIGURE 2 with the yoke of the free or disconnected end of the power take-off drive shaft assembly positioned over the elevated connecting pin.
FIGURE 5 is an enlarged view taken generally along the line 5—5 of FIGURE 2 and illustrating the location of the retainer clip when the connecting pin is in the elevated position.

As seen in FIGURES 3 and 4, the end yoke 27 is provided with a latch pin 31 of conventional design which has a portion of reduced diameter which is movable transversely of the opening 32 in the yoke 27 to permit release of the yoke from the drive or driven shaft in a known manner.

As shown in FIGURES 2, 4 and 5, the shank 19 of the connecting pin 17 is provided with a transverse aperture 33 which receives a retainer clip 34. A second retainer clip 35 is positioned through a similar opening at the lower end of the shank 19 to prevent the inadvertent displacement or removal of the connecting pin 17. The retainer clip 34 functions to permit the connecting pin 17 to be elevated to the position shown with the enlarged head 18 of the connecting pin 17 well above the bifurcated sections 16 of the drawbar 15. In normal operation, the enlarged head 18 of the pin 17 may be located in direct engagement with the upper bifurcated section 16.

When the implement 14 is being moved to a new field location or prepared for road travel, either the connecting yoke 27 or the yoke 28, at the option of the operator, is released from the associated shaft by unlocking the appropriate yoke latch. The tubes 23 and 24 of the extensible power take-off shaft assembly 22 are collapsed to the position shown in solid lines in FIGURE 1 when yoke 27 is disconnected. With the pin 17 in the position shown in FIGURE 2, the yoke 27 is slipped over the enlarged head 18 and the yoke latch 31 released to lock the free end yoke 27 of the assembly 22 to the pin in the manner shown in full side elevation in FIGURES 1 and 3. It can be appreciated that no matter what angular relation is assumed by the prime mover and implement, the power take-off assembly 22 will not be subjected to stress or damage, as the free end is joined to the pivot point with the other end joined to either the prime mover or implement. If the power take-off drive shaft assembly remains connected, the universal joints 25 and 26 are located forwardly and rearwardly of the connecting pin 17. The turning movements of the prime mover 10 relative to the implement 14 during road travel cannot always be compensated for by the universal joints at the ends of the power take-off shaft since it is not rotating during non-operational transportation and the angularity may exceed the limits of the design. In some implements, preparation for road travel requires lateral shifting of the drawbar 15 from the field or operational position to provide for gate and road clearance in a manner well known. This further magnifies the possibility of damage to the power take-off drive shaft 22 if one end is not disconnected.

The retainer pin 34 may be of any suitable design which can be elevated to position the enlarged head 18 of the connecting pin 17 well above the drawbars. Since the yoke 27 rests on the retainer clip 34, the weight of the power take-off shaft assembly 22 will assist in preventing displacement of the connecting pin 17 by vibration during normal road travel. As can be appreciated from inspection of FIGURE 1 and the previous description, the power take-off shaft assembly 22 may be disconnected at either end at the option of the operator of the prime mover with the free or disconnected end placed over the connecting pin 17. In those designs where the power take-off shaft assembly is only usable with the particular implement, the free end of the power take-off shaft assembly 22 may be stored during the off season through the provision of an additional connecting pin which remains with the implement. The method of storing the free end of the power take-off shaft assembly forming a part of this invention is relatively inexpensive to practice, as it requires no additions or modifications to existing equipment but merely requires the novel connecting pin which may be sold with either the implement or prime mover or separately. It is also applicable to existing equipment as well as new designs.

Upon a consideration of the foregoing, it will become obvious to those skilled in the art that various modifications may be made without departing from the invention embodied herein. Therefore, only such limitations should be imposed as are indicated by the spirit and scope of the appended claim.

I claim:

1. In combination with a prime mover having a power take-off connection and an apertured rearwardly projecting drawbar, an implement having a power in-put connection and a forwardly projecting apertured drawbar, and a telescoping drive shaft interconnecting said power take-off and power in-put connections having on at least one end thereof a yoke portion releasably connectible to one of said connections, drawbar pin means comprising a pin having a head on one end of an elongated shank which freely extends through registering apertures in said drawbars to interconnect the same in overlapping relationship, and a removable retainer mounted on said shank at a position intermediate the ends thereof and resting on the uppermost of said drawbars thereby maintaining said head elevated above said uppermost drawbar, said yoke portion removably fitting over said head so as to support one end of said drive shaft while it is disconnected at said one end.

References Cited

UNITED STATES PATENTS

| | | | |
|---|---|---|---|
| 2,341,939 | 2/1944 | Miller | 280—515 X |
| 2,660,444 | 11/1953 | Cade et al. | 280—515 |
| 2,885,015 | 5/1959 | Koch et al. | 180—14 |
| 3,014,545 | 12/1961 | Shepley | 180—14 |
| 3,132,556 | 5/1964 | Doering et al. | 85—5 |
| 3,198,056 | 8/1965 | Gowan | 280—515 X |

BENJAMIN HERSH, *Primary Examiner.*

C. C. PARSONS, J. SIEGEL, *Assistant Examiners.*